United States Patent [19]

Miyaji et al.

[11] Patent Number: 4,592,261
[45] Date of Patent: Jun. 3, 1986

[54] CUTTING DEVICE FOR EXTRA FRINGE OF LAMINATED GLASS INTERLAYER

[75] Inventors: Kiyoshi Miyaji, Matsusaka; Katutoshi Moriyama, Inazawa; Yoshifumi Oka, Suzuka, all of Japan

[73] Assignees: Central Glass Company, Limited, Ube; Toray Engineering Co., Ltd., Osaka; Mitsui & Co., Ltd., Tokyo, all of Japan

[21] Appl. No.: 632,849

[22] Filed: Jul. 20, 1984

[30] Foreign Application Priority Data

Aug. 2, 1983 [JP] Japan .................. 58-140576

[51] Int. Cl.⁴ ............................. B23D 53/00
[52] U.S. Cl. ................. 83/102.1; 83/165; 83/788; 83/801; 83/565; 30/380
[58] Field of Search .......... 83/102.1, 162, 165, 83/168, 788-801, 816, 818, 819, 565; 30/380

[56] References Cited

U.S. PATENT DOCUMENTS

| | | | |
|---|---|---|---|
| 2,010,943 | 8/1935 | Campbell | 83/167 |
| 2,415,877 | 2/1947 | Hajek | 83/797 X |
| 2,585,957 | 2/1952 | Meeker et al. | 83/168 |
| 2,835,296 | 5/1958 | Harrison | 83/168 |
| 2,958,347 | 11/1960 | Blum et al. | 83/801 |
| 4,096,981 | 6/1978 | Martorano . | |

FOREIGN PATENT DOCUMENTS

| | | |
|---|---|---|
| 7234602 | 3/1975 | Fed. Rep. of Germany . |
| 2811706 | 9/1978 | Fed. Rep. of Germany . |
| 2659478 | 1/1980 | Fed. Rep. of Germany . |
| 35-7494 | 4/1935 | Japan . |
| 44-27357 | 11/1969 | Japan . |
| 59-3052 | 1/1984 | Japan . |

Primary Examiner—James M. Meister
Attorney, Agent, or Firm—Schwartz, Jeffery, Schwaab, Mack, Blumenthal & Evans

[57] ABSTRACT

A cutting device comprises an endless band cutter extending between two pulleys, a sliding piece slidingly contacting with the rear face of the endless band cutter to remove adherent from the endless band cutter, and a side plate so arranged as to separate interlayer extra fringe which has been cut off by the endless band cutter from the circumference defining face of the sheets of plate glass. This arrangement prevents the interlayer extra fringe which has been cut off from being taken up by the pulleys and from getting on the plate glass.

4 Claims, 2 Drawing Figures ary extra fringe which has been cut off from being taken up by the pulleys and from getting on the sheet of plate glass.
CUTTING DEVICE FOR EXTRA FRINGE OF LAMINATED GLASS INTERLAYER

BACKGROUND OF THE INVENTION

The present invention relates to a cutting device for cutting off extra fringe of a laminated glass interlayer, such as an interlayer interposed between sheets of plate glass.

Commonly used as a front windshield or the like in automotive vehicles is a safety glass which is a unitary structure formed of at least two sheets of plate glass between each of which is interposed an interlayer of, for example, polyvinyl butyral which produces a bond between the sheets of plate glass. In manufacture of the safety glass, two sheets of plate glass which has been cut to a desired shape and size and an interlayer of polyvinyl butyral which has been cut to a shape and size which is larger than that of the sheets of plate glass are laminated, that portion of the interlayer which is extruded beyond the area of the sheets of plate glass is cut off and removed, and the laminated glass is subjected to an autoclave process.

For continuously cutting off the extra fringe of the interlayer beyond the area of the sheets of plate glass, it is known to perform the cutting by driving a cutting device to run along the circumference defining face of the sheets of plate glass, which cutting device has an endless band cutter extending between an upper pulley and a lower pulley. This cutting device, however, suffers from inconveniences that the extra fringe of the interlayer which has been cut off is apt to be taken up by the pulleys and/or it gets on the plate of glass, thus preventing effecient cutting operation.

SUMMARY OF THE INVENTION

An object of the present invention is to provide a cutting device which is free from the above mentioned inconveniences and ensures smooth continuous and effecient cutting operation.

According to the present invention, the cutting device comprises an endless band cutter extending between two pulleys, a sliding piece slidingly contacting with the rear face of the endless band cutter to remove adherent from the endless band cutter, and a side plate so arranged as to separate interlayer extra fringe which has been cut off by the endless band cutter from the circumeference defining face of the sheets of plate glass. This arrangement prevents the interlayer extra fringe which has been cut off from being taken up by the pulleys and from getting on the sheet of plate glass.

DESCRIPTION OF THE EMBODIMENT

Figure 1:
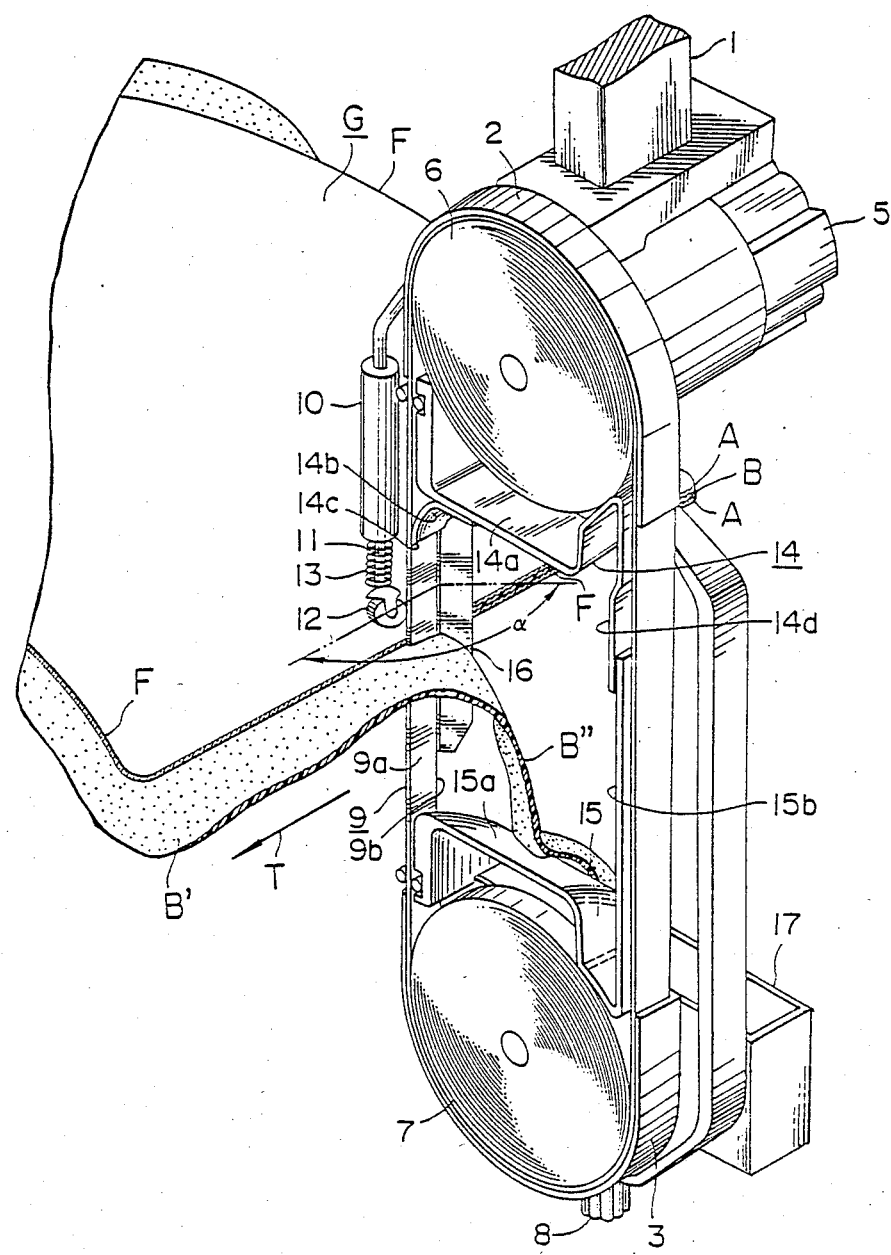
FIG. 1 is a perspective view in diagram of an embodiment of a cutting device according to the present invention.

Referring to FIG. 1, an interlayer cutting device according to the present invention is described hereinafter. The cutting device has a movable arm 1 adapted to be connected to a drive mechanism (not shown). With the drive mechanism, the cutting device can run on any locus which is preset depending upon the shape and size of the plate glass and thus move along the circumference of the sheets of plate glass A. The cutting device comprises a fixed frame 2 mounted on the arm 1 and a pulley unit including a first or driving pulley 6, a second or follower pulley 7 and an endless band cutter 9 extending between the driving and follower pulleys 6 and 7. The driving pulley 6 is fixedly coupled to an output shaft of an electric motor 5 which is mounted on the fixed frame 2. The follower pulley 7 is rotatably mounted on a movable frame 3 which is mounted on a connecting frame 4 for slidable movement toward and away from the fixed frame 2 in a manner which will be described later. The fixed frame 2 covers an upper surface and a rear surface of the driving pulley 6, while the movable frame 3 covers a lower surface and a rear surface of the follower pulley 7. In order to cover a lower surface of the driving pulley 6, an upper cover 14 is mounted on the fixed frame 2. The upper cover 14 includes a cover portion 14a covering the lower surface of the driving pulley 6 and a sliding piece 14b extending downward from the cover portion 14a. The sliding piece 14b has an edge 14c slidably contacting with the rear face 9a of the endless band cutter 9 and directed downward, as viewed in FIGS. 1 and 2, thus serving as a scraper to remove the adherent cut off extra fringe B" of the interlayer B from the endless band cutter 9. In order to cover an upper surface of the follower pulley 7, a lower cover 15 is mounted on the movable frame 3. The lower cover 15 covers an upper surface of the follower pulley 7 and has an inclined surface 15a providing a guide slope for guiding the extra fringe B" of the interlayer B toward the rear with respect to the travelling direction, as indicated by an arrow T in FIG. 1, of the cutting device.

Figure 2:
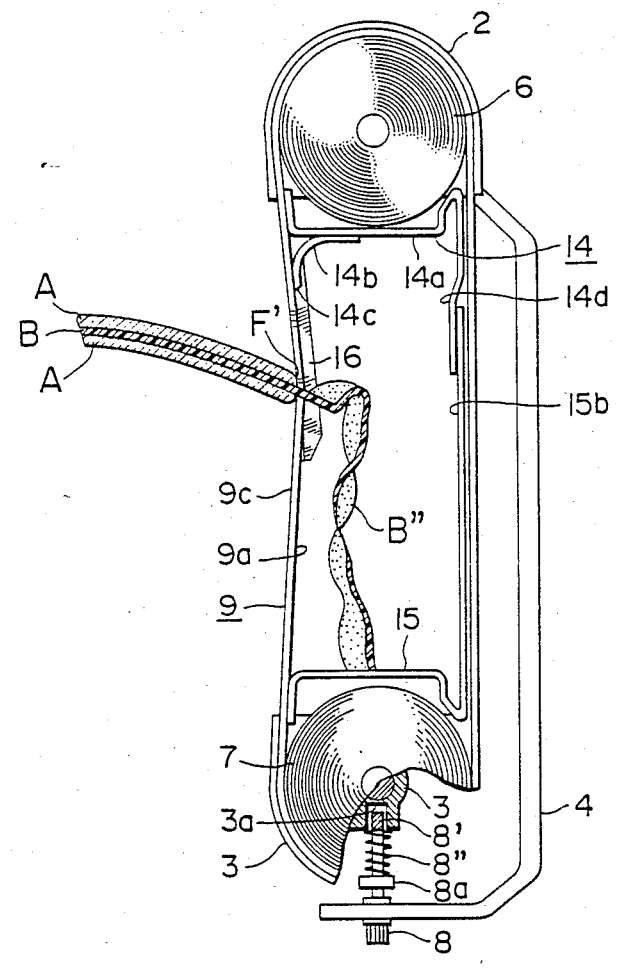
FIG. 2 is a side view of the cutting device used for cutting off extra fringe of an interlayer of a safety glass with protruded margin face.

As best seen in FIG. 2, the upper cover 14 has a portion 14d extending toward the movable frame 3, while the lower cover 15 has a portion 15b extending toward the fixed frame 2 and slidably engageable with the outer surface of the portion 14d of the fixed frame 2. The movable frame 3 is formed with a bore 3a receiving a shaft 8' extending toward the follower pulley 7 from the lower end of the connecting frame 4 as shown in FIG. 2. The arrangement as described above permits the follower pulley 7 to move vertically, as viewed in FIG. 2, toward the driving pulley 6.

In order to ensure correct contact relationship of the front face 9c of the endless band cutter 9 with a circumfrence defining face F of the sheets of plate glass A, it is necessary to adjust the tension of the endless band cutter 9. The adjustment is made by varying the biasing force of a spring 8". The spring 8" encircles the shaft 8' and acts between the movable frame 3 and a flange 8a of the shaft 8', biasing the structure including the movable frame 3, follower pulley 7 and lower cover 15 against the combined weight thereof. The biasing force of the spring 8" is adjustable by manipulating a screw 8 arranged on the lower end of the connecting frame 4. Manipulating the screw 8 causes an axial movement of the shaft 8', varying the biasing force of the spring 8" acting on the movable frame 3 toward the driving pulley 6. For example, manipulating the screw 8 in such a direction as to move the shaft 8' upward as viewed in FIG. 2 causes the spring 8" to reduce its spring force. If, in this state, an external force is applied to the endless band cutter 9, the movable frame 3 is lifted towards the fixed frame 2, decreasing the distance between the driving pulley 6 and the folower pulley 7, thus allowing the endless band cutter 9 to be flexed inward as seen in FIG.

2. Disposed near the endless band cutter 9 is a cylinder 10 mounted on the fixed frame 2. The cylinder 10 slidably receives therein a shaft 11 which has a remote end rotatably carrying a small wheel 12. A spring 13 is so arranged as to bias the small wheel 12 against the surface of the plate glass A so as to allow the small wheel 12 to run on the surface of the plate glass A.

A side plate 16 is mounted on the unitary structure including the fixed frame 2 and the upper cover 14 and arranged near the rear edge 9b of the endless band cutter 9 and having a side surface thereof forming an obtuse angle alpha (α) with the rear face 9a of the endless band cutter 9 for the purpose of preventing the cut off end portion B" of the interlayer B from getting on the surface of the plate glass A.

Mounted on the movable flame 3 is a receiving box 17 which is disposed behind and below the lower cover 15.

Description is now made how to cut off extra fringe B' of the interlayer B by using the cutting device as described above.

A safety glass G is held in a predetermined supporting instrument (not shown), the safety glass G being formed of two sheets of glass plate A having cut to a desired shape and dimension with an interlayer B of polyvinyl butyral interposed therebetween. The electric motor 5 of the cutting device is activated so as to rotate the endless band cutter 9 via the driving pulley 6. With the endless band cutter 9 rotating, the arm 1 is moved toward the circumference of the safety glass G and let the endless band cutter 9 cut into the interlayer extra fringe B'. After the cutting device has assumed a position where the small wheel 12 gets on the plate glass A and the front face 9c of the endless band cutter 9 slidably contacts with the circumference defining face F of the sheets of glass plate A, the arm 1 is driven to move on a predetermined locus. With the small wheel 12 biased against the glass plate A with a force large enough to prevent separation of two sheets of plate glass A which tend to be separated due to sliding contact of the endless band cutter 9 with the circumference defining face F of the plate glass A in a direction toward the small wheel 12, the correct contact relationship of the circumference defining face F of the plate glass A with the front face 9c of the endless band cutter 9 is maintained, thus ensuring accurate cutting operation of the interlayer extra fringe B" extruded beyond the circumference of the sheets of plate glass A. The extruded interlayer extra fringe B" having cut off is guided by the side plate 16 and the inclined surface 15a of the lower cover 15 toward the receiving box 17.

It has been confirmed that the circumference defining face F of the plate glass A is least susceptible to damage when the endless band cutter 9 is driven to slide on the circumference defining face of the plate glass A upward, as viewed in FIG. 1, as compared to the case when the endless band cutter 9 is driven to slide downward. It is assumed that because the sheets of plate glass A are warped downward when the endless band cutter is driven downward, correct contact of the endless band cutter 9 with the cicumference defining face F of the plate glass is not ensured, thus allowing the endless band cutter 9 to frequently deviate from the correct position and slide on the edge of the plate glass A. When the endless band cutter is driven to slide on the circumference defining face of the plate glass A in the upward direction, even if the sheets of the glass plate A tend to be warped upward, such tendency is suppressed by the bias of the small wheel 12, thus ensuring correct sliding contact of the endless band cutter 9 with the circumference defining face F of the plate glass A.

In the case a circumference defining face F' which is protruded as shown in FIG. 2, the endless band cutter 9 is flexed inward to conform to the protrusion of the circumference defining face F' so as to maintain correct contact relationship of the front face 9c of the endless band cutter 9 with the circumference defining face F', thus ensuring that the endless band cutter cuts off the interlayer extra fringe B" accurately along the circumference defining face F of the plate glass A.

If the interlayer extra fringe B" produced by the cutting operation as described above is lifted as being adhered to the endless band cutter 9, it is removed by the sliding piece 14b and then guided by the inclined surface 15a of the lower cover 15 toward the receiving box 17. The interlayer extra fringe B" produced by the cutting is separated away from the plate glass A by the side plate 16, preventing it from getting on the plate glass A, ensuring it being guided toward the receiving box 17.

As previously described, the present invention is embodied, but it is not intended to limit the present invention to this embodiment. For example, it will be readily understood that, in cutting off the interlayer extra fringe B', the present invention may be incorporated not only in an arrangement where a safety glass is fixed and a cutting device is moved, but also in another arrangement where both the safety glass and cutting device are moved or the safety glass is moved with the cutting device kept fixed.

The sliding piece 14b of the upper cover 14 is preferrably made of synthetic resin of anti wearing property or metal because it is always kept sliding on the endless band cutter 9. It may be mounted on the upper cover 14 or formed integral with the upper cover. If it is desired to drive the endless band cutter 9 counterclockwise as viewed in the FIG. 1, the sliding piece must be mounted on the lower cover with its edge directed upward.

The side plate 16 is made of a material flexible generally as much as the endless band cutter 9 and mounted on the upper fixed frame 2 or upper cover 14 or even the lower movable frame 3 such that it is so disposed as to produce substantially no space from the rear edge 9b of the endless band cutter 9.

Although in the described embodiment, the cut off interlayer extra fringe B" is stored in the receiving box 17 mounted on the movable frame 3, it may be stored in a receiving box placed on the floor or a discharge duct may be arranged for ease of conveyance toward the receiving box placed on the floor.

From the above description, it will now be appreciated that, even if it is lifted by the endless band cutter 9, the cut off interlayer extra fringe B" will not be taken up by the upper driving pulley 16 because the sliding piece 14b of the upper cover 14 removes it from the rear face 9a of the endless band cutter 9. Because it is guided by the side plate 16 and the inclinded surface 15a of lower cover 15, the cut off interlayer end portion B" does not get on the plate glass, thus ensuring smooth and continuous cutting operation.

What is claimed is:

1. A cutting device for cutting off extruded extra fringe of an interlayer interposed between sheets of plate glass beyond the area of the sheets of plate glass, the cutting device being arranged to be movable to run along the circumference of the sheets of glass, the cutting device comprising:

a pulley unit including a first pulley, a second pulley, an endless band cutter extending between said first and second pulleys and frame means for carrying said first and second pulleys, said endless band cutter having a front edge and a rear edge with respect to the direction of running of the cutting device;

wherein said pulley unit is arranged such that said first pulley is substantially vertically spaced from said second pulley, and said frame means includes a fixed frame covering said first pulley, a connecting frame integral with said fixed frame, and a movable frame rotatably carrying said second pulley, mounted on said connecting frame, and arranged to be displaceable with respect to said fixed frame;

means mounted on said frame means for driving said endless band cutter in a predetermined rotational direction;

a sliding piece mounted on said frame means and slidably contacting with a rear face of said endless band cutter for removing adherent from said endless band cutter;

a side plate mounted on said frame means and disposed near the rear edge of the endless band cutter, said side plate having a surface forming a predetermined obtuse angle with the adjacent surface portion of the back of said endless band cutter; and means for guiding the extruded extra fringe of the interlayer which has been cut off by said endless band cutter toward the rear with respect to the direction of running of the cutting device.

2. A cutting device as claimed in claim 1, wherein said guiding means includes a lower cover mounted on said movable frame and having an inclined surface providing a guide slope.

3. A cutting device as claimed in claim 2, wherein said movable frame has mounted thereon a receiving box disposed behind and below said lower cover.

4. A cutting device as claimed in claim 1, wherein said fixed frame has mounted thereon an upper cover, said sliding piece is mounted on said upper cover and has an edge thereof slidably contacting with the rear face of said endless band cutter and directed downward, and said side plate is positioned near said sliding piece.

* * * * *